United States Patent
Ghosh et al.

(10) Patent No.: US 8,599,721 B2
(45) Date of Patent: *Dec. 3, 2013

(54) COMPOSITE NEXT HOPS FOR FORWARDING DATA IN A NETWORK SWITCHING DEVICE

(75) Inventors: Kaushik Ghosh, Sunnyvale, CA (US); Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 13/009,367

(22) Filed: Jan. 19, 2011

(65) Prior Publication Data

US 2011/0110373 A1    May 12, 2011

Related U.S. Application Data

(63) Continuation of application No. 12/107,808, filed on Apr. 23, 2008, now Pat. No. 7,898,985.

(51) Int. Cl.
*H04L 12/28* (2006.01)
*H04L 12/56* (2011.01)

(52) U.S. Cl.
USPC .......................................... 370/254; 370/401

(58) Field of Classification Search
None
See application file for complete search history.

(56) References Cited

U.S. PATENT DOCUMENTS

| | | | |
|---|---|---|---|
| 6,259,699 B1 * | 7/2001 | Opalka et al. ................. | 370/398 |
| 6,385,199 B2 | 5/2002 | Yoshimura et al. | |
| 6,721,800 B1 * | 4/2004 | Basso et al. ................... | 709/239 |
| 6,798,777 B1 * | 9/2004 | Ferguson et al. ............. | 370/392 |
| 6,901,048 B1 * | 5/2005 | Wang et al. ................... | 370/228 |
| 6,987,735 B2 | 1/2006 | Basso et al. | |
| 7,028,101 B2 * | 4/2006 | Costa-Requena et al. .... | 709/245 |
| 7,079,501 B2 * | 7/2006 | Boivie ......................... | 370/312 |
| 7,099,324 B2 * | 8/2006 | Kametani .................... | 370/392 |
| 7,116,640 B2 | 10/2006 | Tasman et al. | |
| 7,190,696 B1 * | 3/2007 | Manur et al. .................. | 370/392 |
| 7,206,315 B2 * | 4/2007 | Matsuzawa et al. .......... | 370/409 |
| 7,215,637 B1 * | 5/2007 | Ferguson et al. ........... | 370/230.1 |
| 7,325,071 B2 | 1/2008 | Krishnan | |
| 7,327,727 B2 | 2/2008 | Rich et al. | |
| 7,362,752 B1 | 4/2008 | Kastenholz | |
| 7,397,795 B2 * | 7/2008 | Liu et al. ...................... | 370/389 |
| 7,398,438 B2 | 7/2008 | Agarwal et al. | |
| 7,450,580 B2 | 11/2008 | Itonaga et al. | |
| 7,460,481 B2 | 12/2008 | Vasseur et al. | |

(Continued)

OTHER PUBLICATIONS

Co-pending U.S. Appl. No. 12/107,808, filed Apr. 23, 2008 entitled "Composite Next Hops for Fowarding Data in a Network Switching Device" by Kaushik Ghosh et al., 43 pages.

*Primary Examiner* — Gregory Sefcheck
(74) *Attorney, Agent, or Firm* — Harrity & Harrity, LLP

(57) ABSTRACT

A network device includes a memory, a routing engine and a forwarding engine. The memory stores a forwarding table and the routing engine constructs a first composite next hop that includes multiple next hops, where each of the multiple next hops represents an action to be taken on a data unit as it transits the network device or represents another composite next hop, and where the first composite next hop specifies a function to be performed on the plurality of next hops. The routing engine further stores the composite next hop in an entry of the forwarding table. The forwarding engine retrieves the composite next hop from the forwarding table, and forwards a data unit towards one or more network destinations based on the composite next hop.

20 Claims, 16 Drawing Sheets

(56) References Cited

U.S. PATENT DOCUMENTS

| | | | |
|---|---|---|---|
| 7,512,085 B2 | 3/2009 | Fernandes et al. | |
| 7,564,806 B1 | 7/2009 | Aggarwal et al. | |
| 7,570,649 B2 | 8/2009 | Qian et al. | |
| 7,606,148 B2 | 10/2009 | Toumura et al. | |
| 7,616,574 B2 | 11/2009 | Previdi et al. | |
| 7,710,962 B2 | 5/2010 | Kodama et al. | |
| 7,729,260 B2 * | 6/2010 | Larsson et al. | 370/238 |
| 7,739,497 B1 | 6/2010 | Fink et al. | |
| 7,756,039 B2 * | 7/2010 | Yonge et al. | 370/235 |
| 7,898,985 B1 * | 3/2011 | Ghosh et al. | 370/254 |
| 8,122,118 B2 * | 2/2012 | Hickson et al. | 709/224 |
| 8,238,246 B2 * | 8/2012 | Ferguson et al. | 370/235 |
| 2002/0101872 A1 | 8/2002 | Boivie | |
| 2003/0076825 A1 | 4/2003 | Guruprasad | |
| 2005/0068948 A1 | 3/2005 | Bhardwaj | |
| 2006/0072574 A1 | 4/2006 | Akahane et al. | |
| 2006/0268682 A1 | 11/2006 | Vasseur | |
| 2007/0030852 A1 | 2/2007 | Szczesniak et al. | |
| 2008/0008178 A1 | 1/2008 | Tychon et al. | |
| 2008/0107114 A1 | 5/2008 | Liu | |
| 2008/0177896 A1 | 7/2008 | Quinn et al. | |
| 2009/0003349 A1 | 1/2009 | Havemann et al. | |
| 2009/0003375 A1 | 1/2009 | Havemann et al. | |
| 2009/0201898 A1 | 8/2009 | Gong et al. | |
| 2009/0252033 A1 | 10/2009 | Ramakrishnan et al. | |

* cited by examiner

COMPOSITE NEXT HOPS FOR FORWARDING DATA IN A NETWORK SWITCHING DEVICE

RELATED APPLICATION

This application is a continuation of U.S. patent application Ser. No. 12/107,808, filed Apr. 23, 2008, now U.S. Pat. No. 7,898,985, which is incorporated herein by reference.

BACKGROUND

Current networks typically include devices, such as routers, switches or gateways, which transfer or switch data from one or more sources to one or more destinations. A packet is one format of data in which encapsulated data can be transmitted through a network. A router is a switching device that receives packets containing a data payload and control information at input ports and, based on destination or other information included in the packets, may forward the packets through output ports to the destinations or intermediary destinations. Routers determine the proper output port for a particular packet by evaluating header information included in the packet.

Existing routers include forwarding engines for receiving and forwarding incoming packets to their intended destinations. To forward incoming packets from input port to an appropriate output port, routers may perform complex data manipulation actions. Such data manipulation actions may include storing and retrieving encapsulation data required for constructing outgoing packet headers and forwarding outgoing packets based on routing data accumulated using network routing protocols.

SUMMARY

In accordance with one implementation, a method may include constructing a first composite next hop that comprises a plurality of next hops, where each of the plurality of next hops represents an action to be taken on a data unit as it transits a routing device or represents another composite next hop, and where the first composite next hop specifies a first function to be performed on the plurality of next hops. The method may further include storing a reference to the first composite next hop in one of multiple entries of a forwarding table and storing next hop addresses in other entries of the multiple entries of the forwarding table. The method may also include receiving a data unit and using the forwarding table to forward the data unit towards one or more network destinations based on the composite next hop or one of the next hop addresses.

In another implementation, a network device may include a memory configured to store a forwarding table, a routing engine and a forwarding engine. The routing engine may be configured to construct a first composite next hop that comprises a plurality of next hops, where each of the plurality of next hops represents an action to be taken on a data unit as it transits the network device or represents another composite next hop, and where the first composite next hop specifies a first function to be performed on the plurality of next hops. The routing engine may be further configured to store the composite next hop in an entry of the forwarding table. The forwarding engine may be configured to retrieve the composite next hop from the forwarding table, and forward a data unit towards one or more network destinations based on the composite next hop.

In still another implementation, a system may include a routing engine configured to store next hop entries in a forwarding table, where at least one of the next hop entries includes a composite next hop that includes a plurality of next hops, where each of the plurality of next hops represents an action to be taken on a data unit as it transmits a network device or represents another composite next hop and where the composite next hop specifies a function to be performed on the plurality of next hops. The system may further include a forwarding engine configured to access the at least one of the next hop entries to retrieve the composite next hop, perform the function on the plurality of next hops as specified by the composite next hop, and forward a received data unit based on performance of the function on the plurality of next hops.

In yet another implementation, a system may include means for storing next hop entries in a forwarding table, where at least one of the next hop entries comprises a composite next hop that includes multiple next hops, where each of the multiple next hops represents an action to be taken on a data unit as it transits a network device or represents another composite next hop and where the composite next hop specifies a function to be performed on the multiple next hops. The system further includes means for accessing the forwarding table to retrieve the composite next hop, means for performing the function on the multiple next hops as specified by the composite next hop, and means for forwarding a received data unit based on performance of the function on the multiple next hops.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

Figure 1:
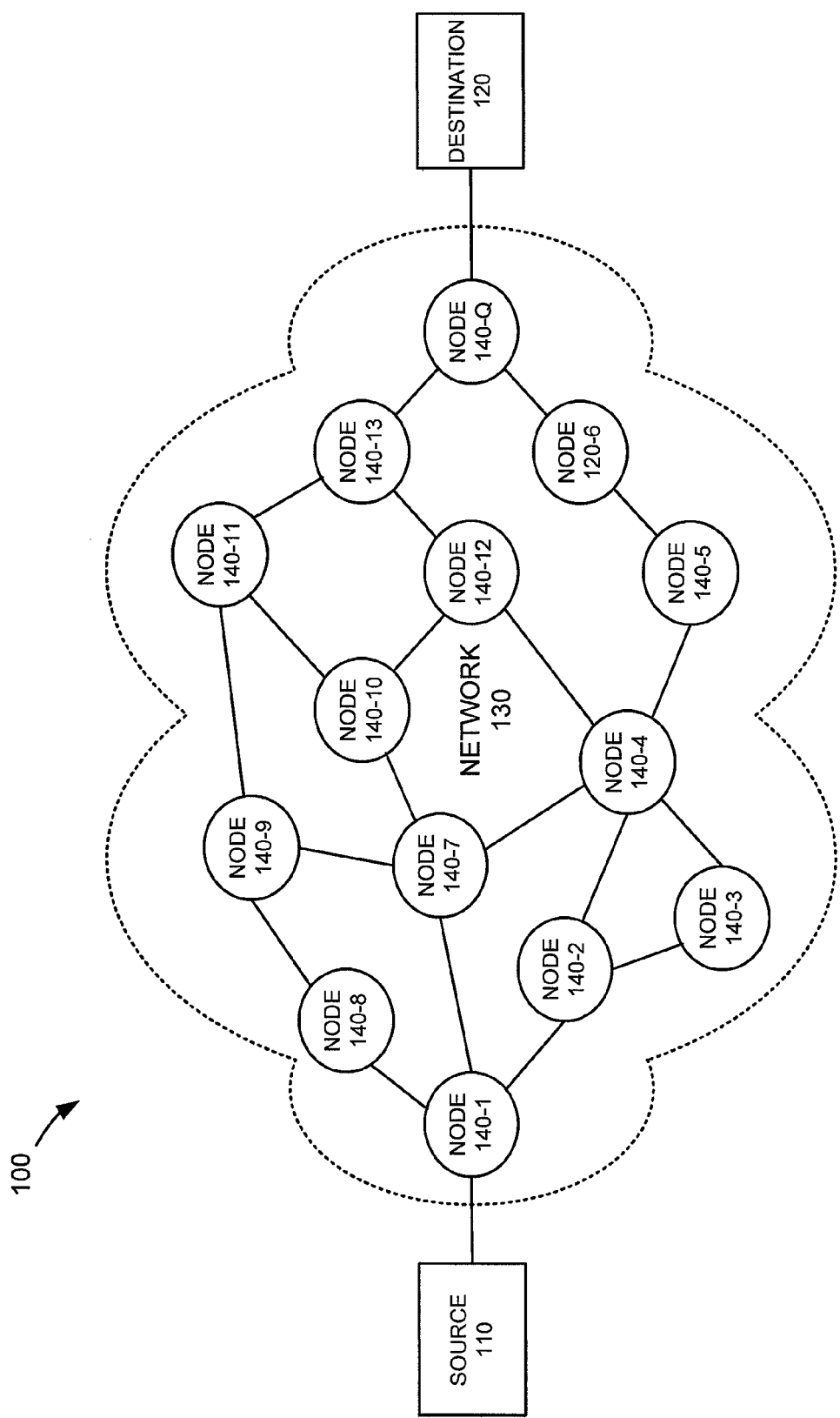
FIG. 1 is a diagram of an exemplary network.

The following detailed description refers to the accompanying drawings. The same reference numbers may be used in different drawings to identify the same or similar elements. Also, the following detailed description does not limit the invention. Instead, the scope of the invention is defined by the appended claims and equivalents.

Exemplary embodiments described herein may permit the construction and use of composite next hops in data unit forwarding tables, where each composite next hop may include an arbitrary composition of next hops to an arbitrary degree. In one exemplary embodiment, an entry in a forwarding table may include a unicast next hop address, a list of unicast next hop addresses, or an indirect pointer to a list of unicast next hop addresses. In a further exemplary embodiment described herein, an entry in a forwarding table may include hierarchical, nested lists of unicast next hop addresses to an arbitrary degree, or a flood of lists of unicast next hop addresses. A composite next hop, as described herein, may be akin to a "subroutine" call of pre-set-up forwarding activities and may permit the required number of next hops to be substantially reduced.

A typical, simple "next hop" may include an elementary action performed on a packet as it transits a router. Examples of elementary actions include replacing a layer 2 (L2) header of a data unit, performing a layer 3 (L3) action (e.g., network address translation (NAT)) on the data unit, or making a copy of the data unit (replication for sampling). A "composite next hop" as the term is used herein refers to a commonly referenced collection of other next hops (e.g., either simple elemental next hops or composite next hops) and a function to be performed on those next hops (e.g., C=F(N1, N2, ... Nn), where C is the composite next hop, F is the function and {N1, N2, ..., Nn} is the collection of next hops that the function is acting upon). Examples of the function (F) may include (but is not limited to): 1) perform any one of the actions of the next hops in the composite next hop; 2) perform all of the actions sequentially of the next hops in the composite next hop; 3) perform the actions of the next hops until some condition CON evaluates to true (alternatively to false) and then transit the data unit, or take a different set of actions; or 4) make copies of the data unit and perform the action on all of the copies.

Composite next hops, as described herein, permit actions to be taken on data units transiting a routing device that are similar to the use of functions or subroutines in high-level computer programming. Elemental next hops can be put together via composite next hops to form arbitrarily powerful actions, limited only what types of elemental next hops are available, the amount of available memory, and the cycle budget for processing a data unit. Through the use of composite next hops, the control plane does not have to re-do the action of the specific elemental action for each composition in which it is a part. In the absence of composite next hops, the actions of each elemental next hop would have to re-doned in each disparate next hop of which it is a part. This would require the control plane to track and update each of the elemental next hops' actions distinctly in the disparate compositions. Composite next hops permit the control plane to update just the specific elemental next hop. Composite next hops, thus, afford scaling, use less memory and permit fast reconvergence due to being able to update specific parts of a composite. Composite next hops also permit complex chains of elemental next hops to be put together in a modular fashion.

Exemplary Network

FIG. 1 illustrates a network 100 according to an exemplary embodiment. Network 100 may include a source node 110 and a destination node 120 interconnected via a network 130. Source node 110 and destination node 120 may each include, for example, a host or a server. Source node 110 and destination node 120 may connect with network 130 via wired, wireless or optical connection links. Network 130 may include one or more networks of any type, including a local area network (LAN), metropolitan area network (MAN), wide area network (WAN), Internet, or Intranet. Network 130 may include any number of network nodes for routing data units through network 130, with multiple nodes 140-1 through 140-Q (generically and individually referred to herein as a "node 140-x") shown in FIG. 1 by way of example. Each network node 140-x may include a network device, such as, for example, a router, a switch, or a gateway, that routes or switches incoming data units towards one or more destinations. Data units that originate at source node 110 may be routed to destination node 120 via multiple ones of nodes 140-1 through 140-Q.

The number and configuration of nodes depicted in FIG. 1 is for illustrative purposes only. A network may include different, more or fewer nodes than are illustrated in FIG. 1. Additionally, only a single source node 110 and destination node 120 have been shown in FIG. 1 for purposes of simplicity. However, multiple sources nodes and destination nodes may be coupled to network 130.

Exemplary Network Node

Figure 2A:
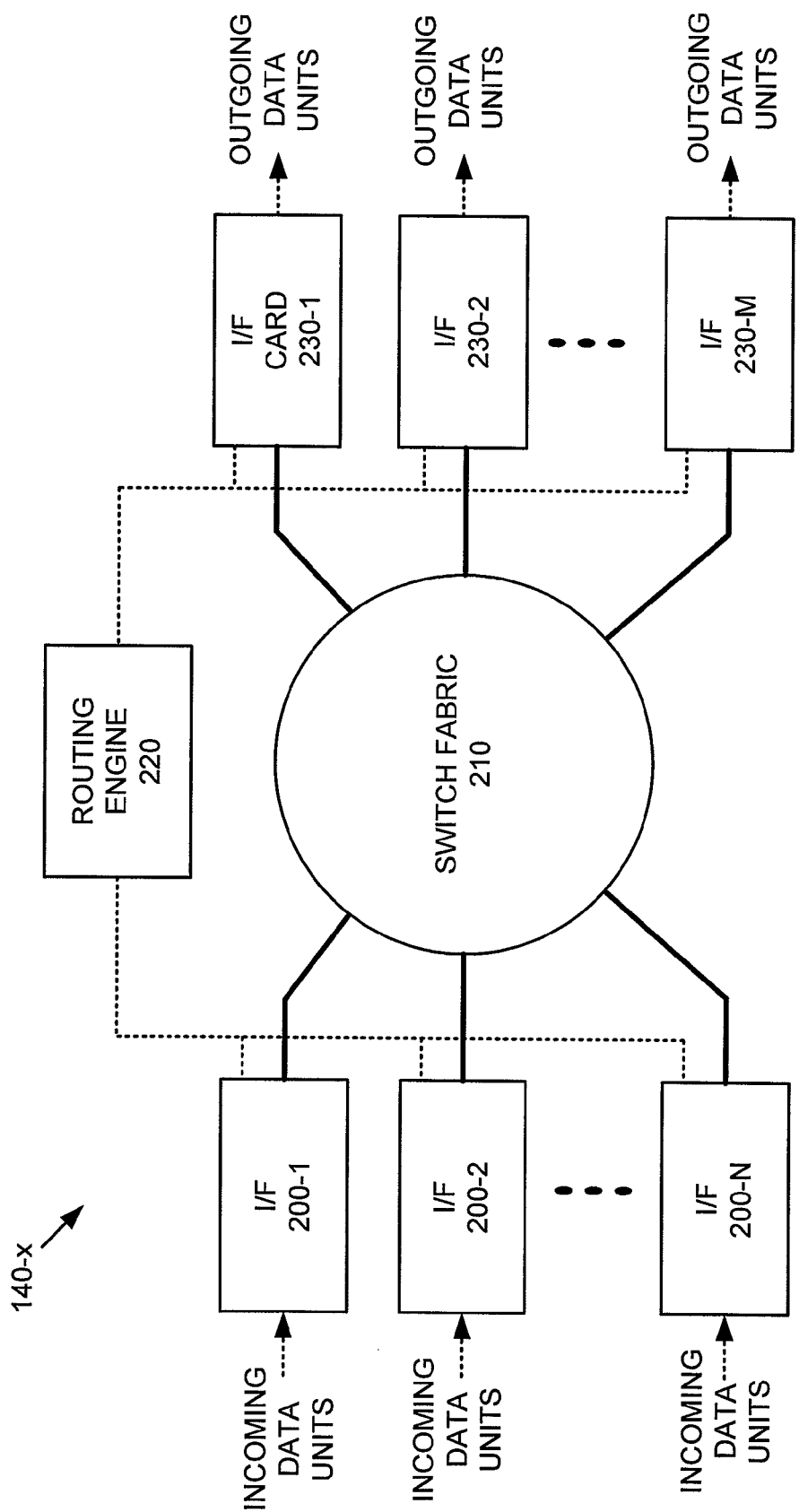
FIG. 2A is a diagram of a network node according to an exemplary implementation.

FIG. 2A illustrates a network node 140-x according to an exemplary implementation. Network node 140-x may receive one or more data units from one or more incoming physical links, process the data units to determine destination information, and transmit the data units on one or more outgoing links in accordance with the destination information or one or more other properties of the data units. The data units may include packets, cells, or datagrams; fragments of packets, cells, or datagrams; or other types of data. The one or more incoming physical links and the one or more outgoing links may connect to network 130.

Network node 140-x may include one or more ingress interfaces 200-1 through 200-N (generically and individually referred to herein as an "ingress interface 200"), a switch fabric 210, a routing engine 220, and one or more egress interfaces 230-1 through 230-M (generically and individually referred to herein as an "egress interface 230"). Each ingress interface 200 may receive data units from network 130 via one or more physical links and may forward the received data units through switch fabric 210 to a respective egress interface. Each ingress interface 200 may forward received data units to a respective egress interface 230 using forwarding tables received from routing engine 220. Routing engine 220 may communicate with other of nodes 140-1 through 140-Q connected to network node 140-x to exchange information regarding network topology. Routing engine 220 may create routing tables based on the network topology information and forward the routing tables to each ingress interface 200 and each egress interface 230. Routing engine 220 may also perform other general control and monitoring functions for network node 140-x.

Switch fabric 210 may include one or more switching planes to facilitate communication between ingress interface 200-1 through 200-N and egress interfaces 230-1 through 230-M. In one exemplary implementation, each of the switching planes may include a three-stage switch of crossbar elements. Other types of switching planes may, however, be used in switch fabric 210. Egress interfaces 230-1 through 230-M may receive data units from switch fabric 210 and may forward the data units towards destinations in the network (e.g., a next hop destination) via one or more outgoing physical links.

Network node 140-x may include fewer, additional and/or different components than are shown in FIG. 2A. For example, network node 140-x may include one or more intermediate service cards (not shown) that connect to switch fabric 210 and which may include special purpose cards that perform various specialized functions. For example, the intermediate service cards may include a firewall service card, an intrusion detection service card, an encryption/decryption service card, or other types of special purpose cards.

The interfaces in FIG. 2A have been arbitrarily designated as "ingress interfaces" or "egress interfaces" for purposes of illustration. Each one of interfaces 200-1 through 200-N or 230-1 through 230-M may act as an ingress and/or an egress interface. Thus, each one of interfaces 200-1 through 200-N or 230-1 through 230-M may receive data units from the external network, or forward data units received from switch fabric 210 towards destinations in network 130.

Figure 2B:
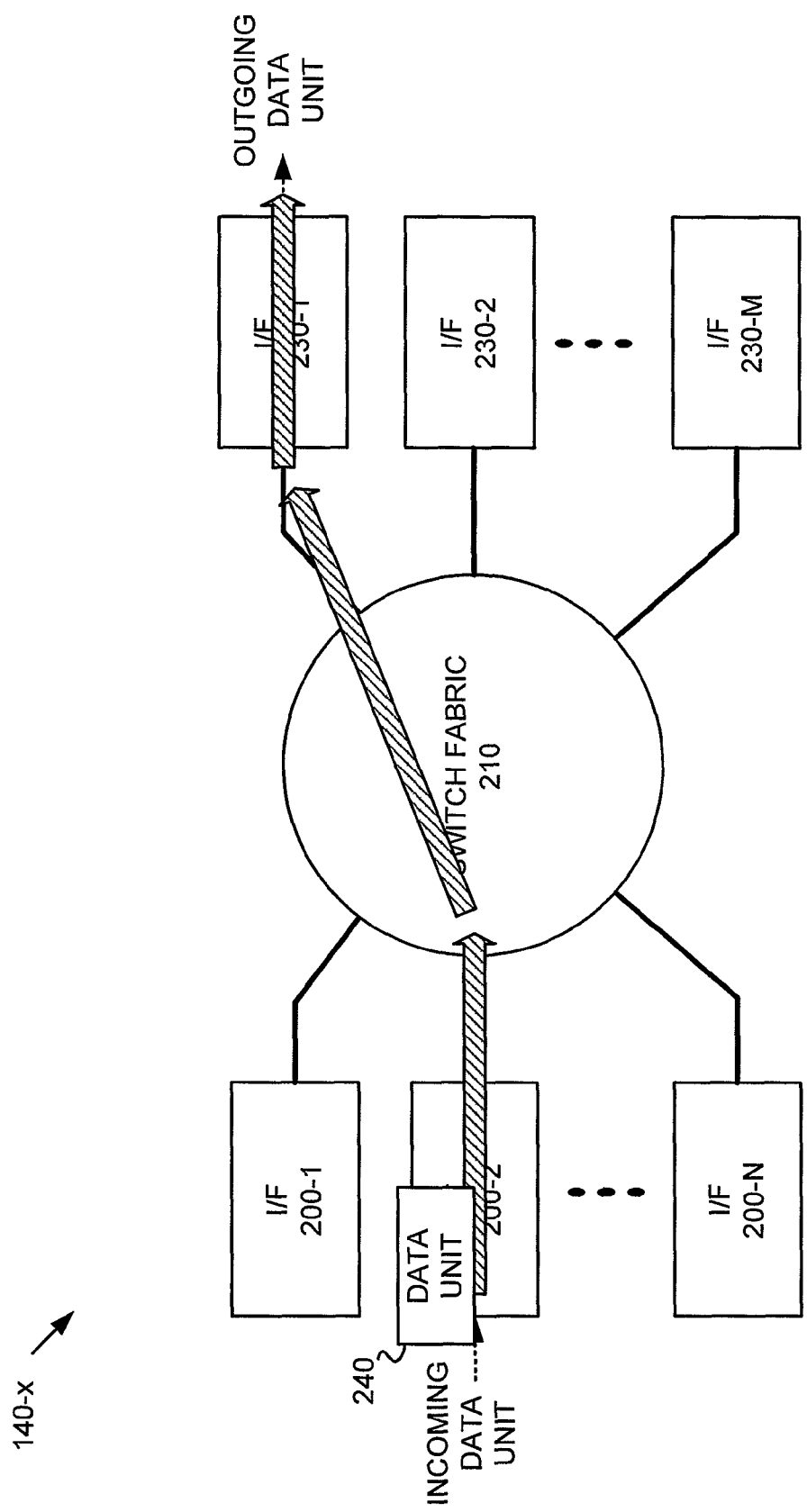
FIGS. 2B, 2C and 2D are diagrams of exemplary paths data units may take when traversing the exemplary network node of FIG. 2A.
Figure 2C:
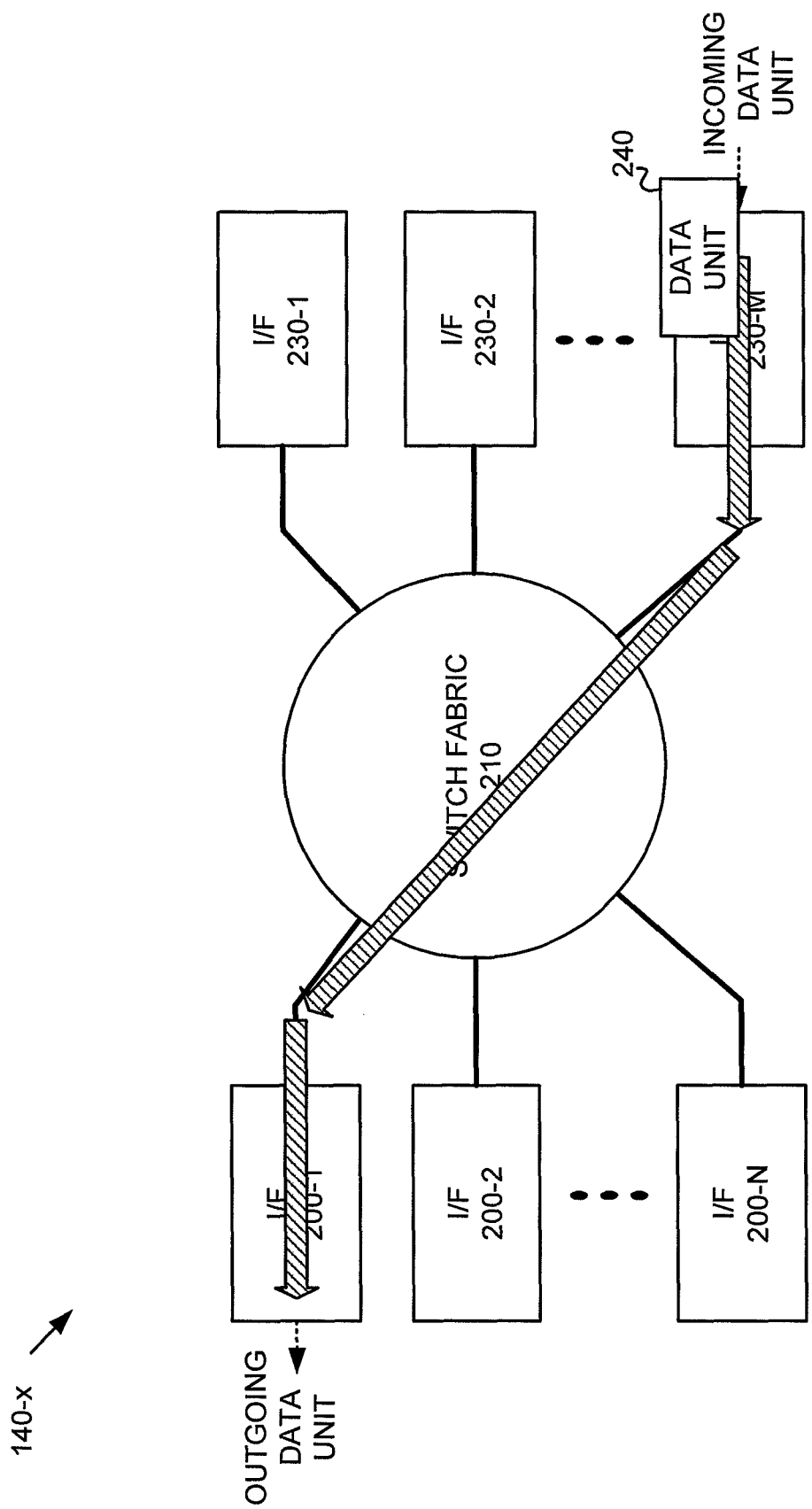
Figure 2D:
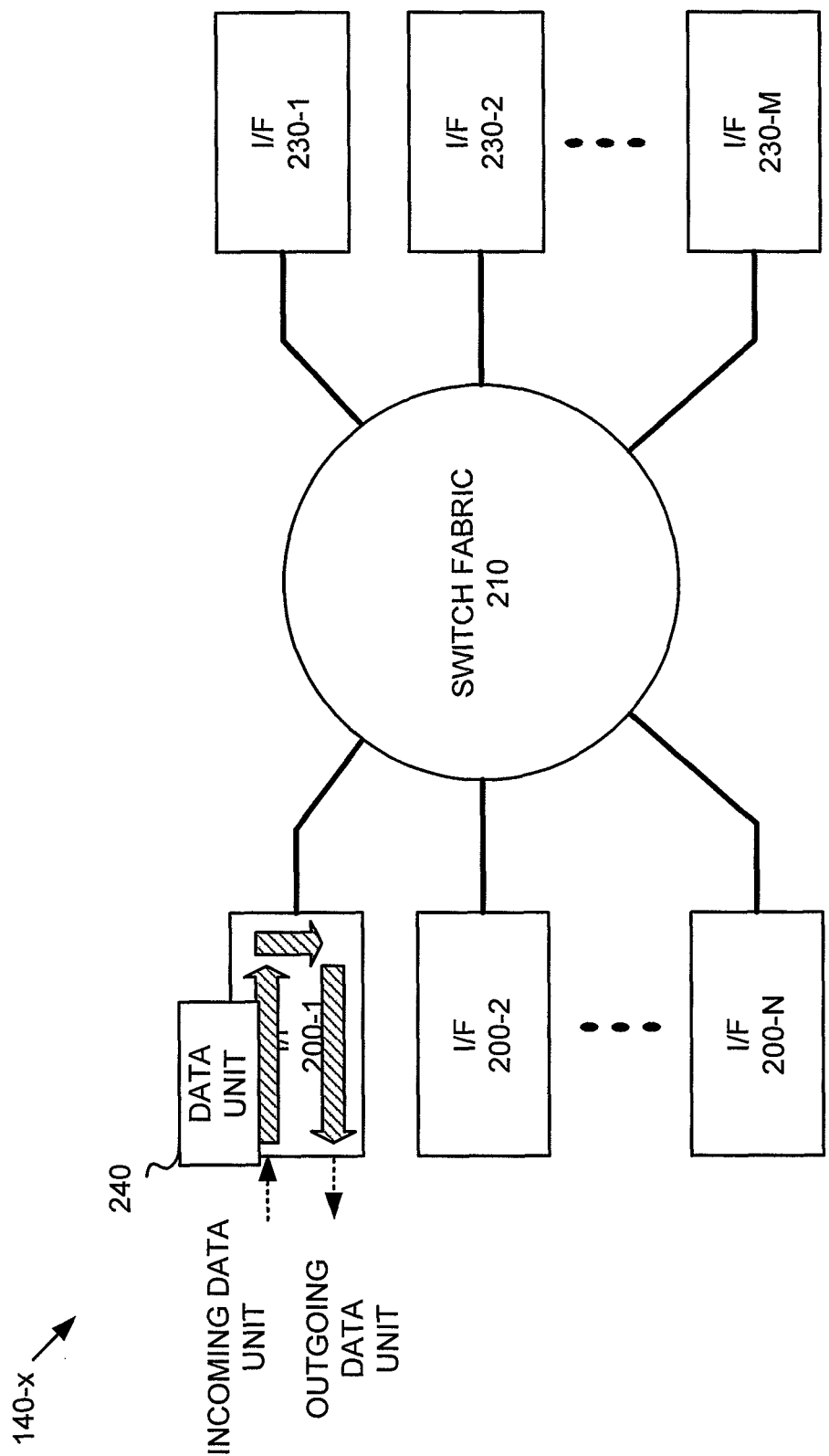

FIGS. 2B, 2C and 2D illustrate examples of interfaces 200 and 230 acting as both ingress and egress interfaces, and examples of paths through network device 140-x that includes interfaces 200 and/or 230. As shown in the example of FIG. 2B, a data unit 240 may be received at an interface 200-2, acting as an ingress interface, from external network 130 and data unit 240 may be forwarded to an interface 230-1, acting as an egress interface, via switch fabric 210. Interface 230-1 may forward data unit 240 towards its destination in the external network 130 via an outgoing link.

As further shown in the example of FIG. 2C, a data unit 240 may be received at an interface 230-M, acting as an ingress interface, from external network 130 and data unit 240 may be forwarded to an interface 200-1, acting as an egress interface, via switch fabric 210. Interface 200-1 may forward data unit 240 towards its destination in external network 130 via an outgoing link.

As also shown in the example of FIG. 2D, data unit 240 may be received at interface 200-1, acting as an ingress interface, from external network 130. Interface 200-1 may then forward data unit 240 towards its destination in external network 130 via the same link from which the data unit was received. Interface 200-1, thus, in this example, acts as both an ingress interface and an egress interface for the same data unit.

Exemplary Interface

Figure 3:
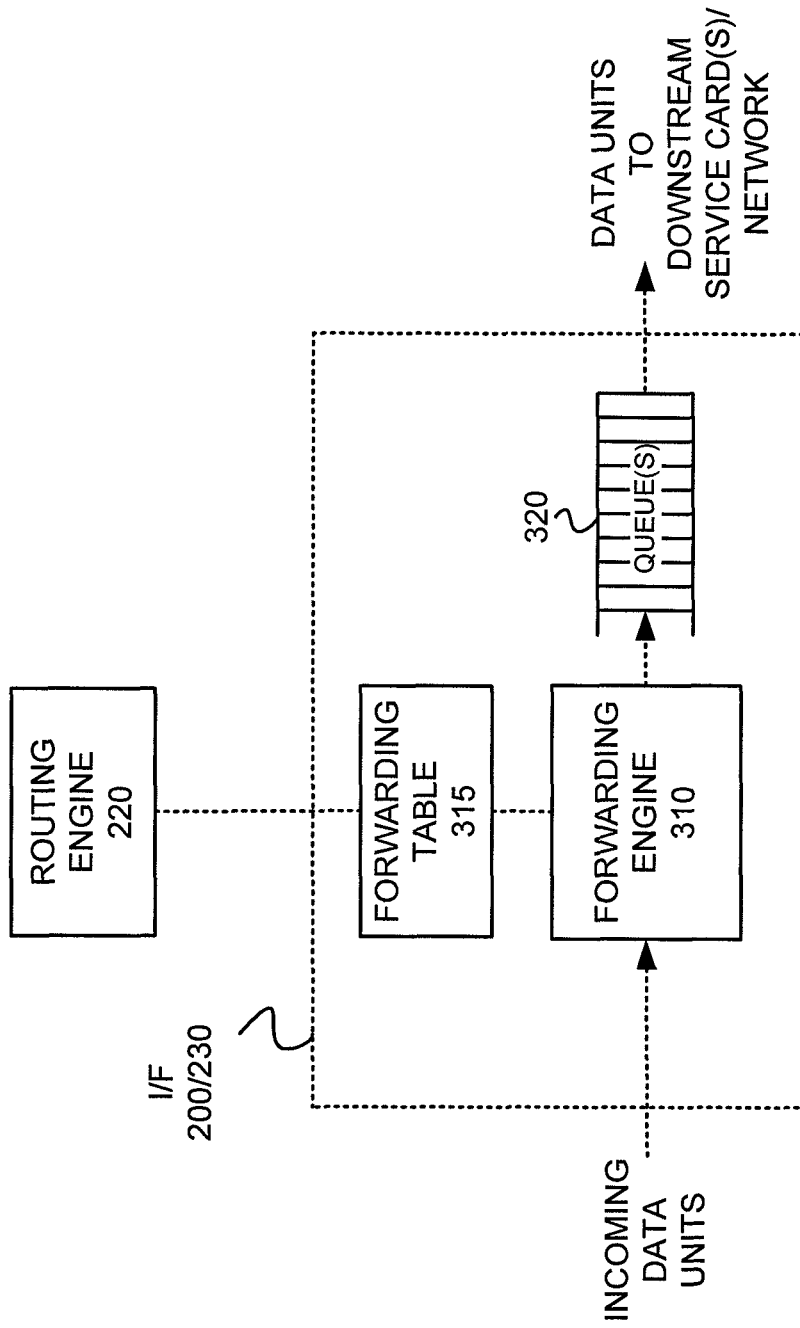
FIG. 3 is a diagram of an exemplary configuration of an interface of the network node of FIG. 2A.

FIG. 3 illustrates exemplary components of an interface 200/230. As shown in FIG. 3, interface 200/230 may include a forwarding engine 310, a forwarding table 315, and one or more queues 320. FIG. 3 further depicts routing engine 220 being connected to interface 200/230. Routing engine 220 may supply the contents of forwarding table 315 to interface 200/230 based on network topology information. Routing engine 220 may further construct composite next hops, described herein, and store those composite next hops in selected entries of forwarding table 315.

Forwarding engine 310 may receive data units from switch fabric 210, or from a physical link connected to network 130 and may inspect one or more properties (e.g., header destination node address) of each data unit, retrieve a next hop/composite next hop from forwarding table 315, and modify the header of each data unit to forward the data unit to its retrieved next hop (e.g., insert next hop information in the header). Forwarding engine 310 may then queue each data unit in queue(s) 320. The data units queued in queue(s) 320 may be selectively dequeued and forwarded to a downstream interface 200/230, via switch fabric 210, or to network 130. Interface 200/230 may, in some implementations, include fewer, additional or different components than those shown in FIG. 3.

Exemplary Data Unit

Figure 4:
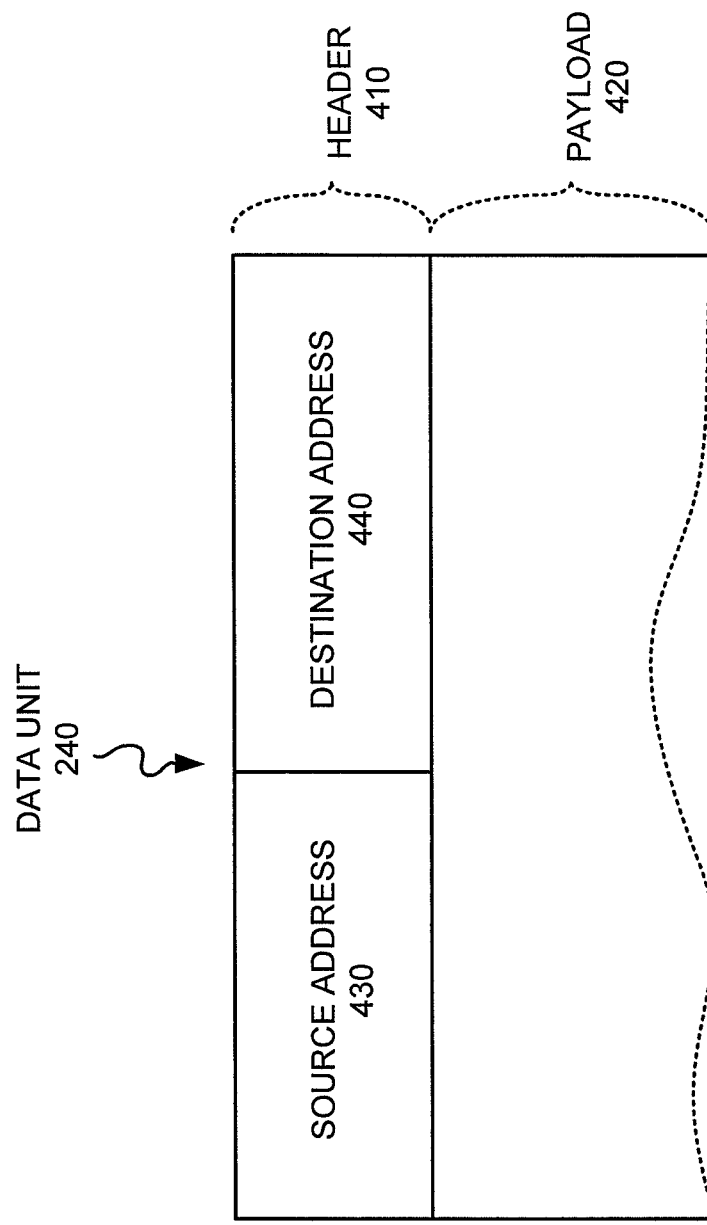
FIG. 4 is an exemplary diagram of a data unit that may traverse the network of FIG. 1 from a source to a destination.

FIG. 4 illustrates an exemplary data unit 240 that may originate at source node 110 and may be sent to destination node 120 via multiple ones of nodes 140-1 through 140-Q of network 130. Data unit 240, as shown in FIG. 4, depicts exemplary contents of the data unit at an intermediate node (e.g., one of nodes 140-1 through 140-Q) of network 130 as data unit 240 is being forwarded hop by hop towards destination node 120. Data unit 240 may include, among other data, a header 410 and a payload 420. Header 410 may include a source address 430 and a destination address 440. A next hop address (not shown) may, or may not, be present in header 410. In many implementations, a next hop address may not be present in header 410 such as, for example, in most cases of IP/MPLS forwarding (unless the sender carries out source routing). In these implementations, the next hop address, which may include an IP address associated with a node that is an adjacent, next hop from the current node toward the destination in network 130, may be deduced at each node 140 in network 130 using a forwarding table lookup based on destination address 440 and in conjunction with any configured forwarding policies at node 140. Source address 430 may include, for example, an Internet Protocol (IP) address associated with the node (e.g., source node 110) that was the source of the data unit. Destination address 440 may include, for example, an IP address associated with the node (e.g., destination node 120) that is the destination of data unit 240. Header 410 may include additional, fewer or different data than the exemplary data shown in FIG. 4. Payload 420 may include the message data being sent between source node 110 and destination node 120.

Exemplary Forwarding Table

Figure 5:
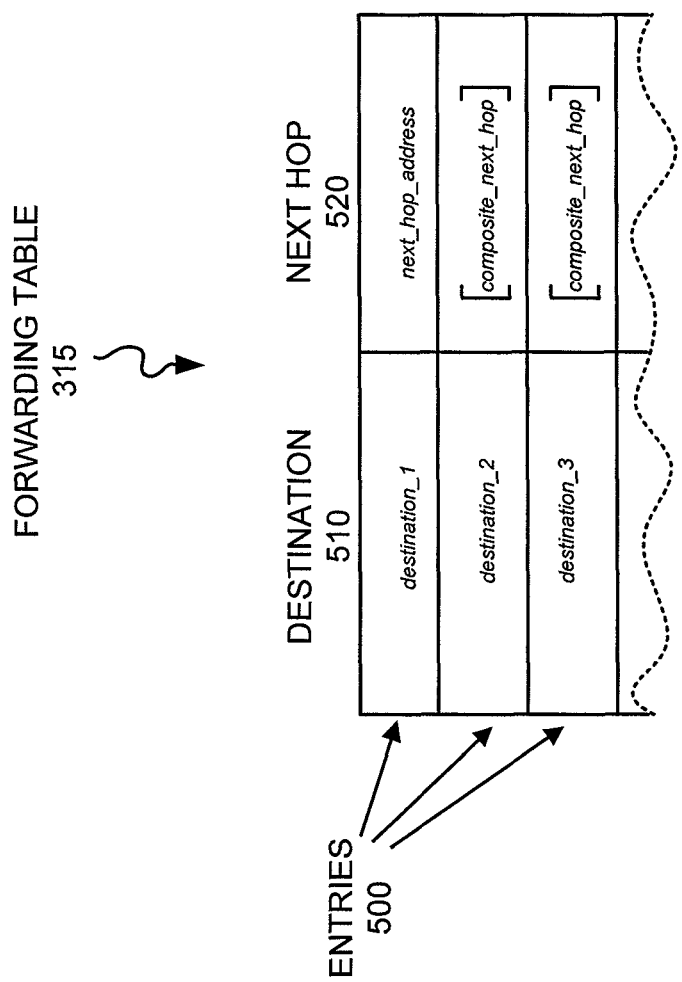
FIG. 5 is a diagram of a forwarding table according to an exemplary implementation.

FIG. 5 illustrates forwarding table 315 according to an exemplary implementation. Forwarding table 315 may include multiple entries 500, each of which may include a destination field 510 and a next hop field 520. Destination field 510 may include an address associated with a destination node in network 130 (e.g., destination node 120). For example, each destination field 510 may include an Internet Protocol (IP) address associated with a destination node in network 130. Next hop field 520 may include an address associated with a next hop node to which a data unit 500 may be forwarded on a path to data unit 240's network destination. Next hop field 520 alternatively may also include a composite next hop that may include next hop addresses and references to other composite next hops. Thus, a composite next hop may be referenced by an index in forwarding table 315 and a list of other next hops under the composite next hop may not necessarily have to be present as immediate data in the forwarding table. Additionally, there may be one or more composite next hops (or any other next hop type) under a parent composite next hop, and the level of nesting of the composite next hops may be arbitrary (i.e., determined by what a given application requires). Examples of various different composite next hops are described in further detail below. For a given data unit 240 received at a node 140-x, destination address 440 from the data unit's header may be retrieved to identify a next hop 520 in an entry 500 of forwarding table 315 whose destination 510 matches the destination address 440.

Exemplary Composite Next Hop Construction Process

Figure 6:
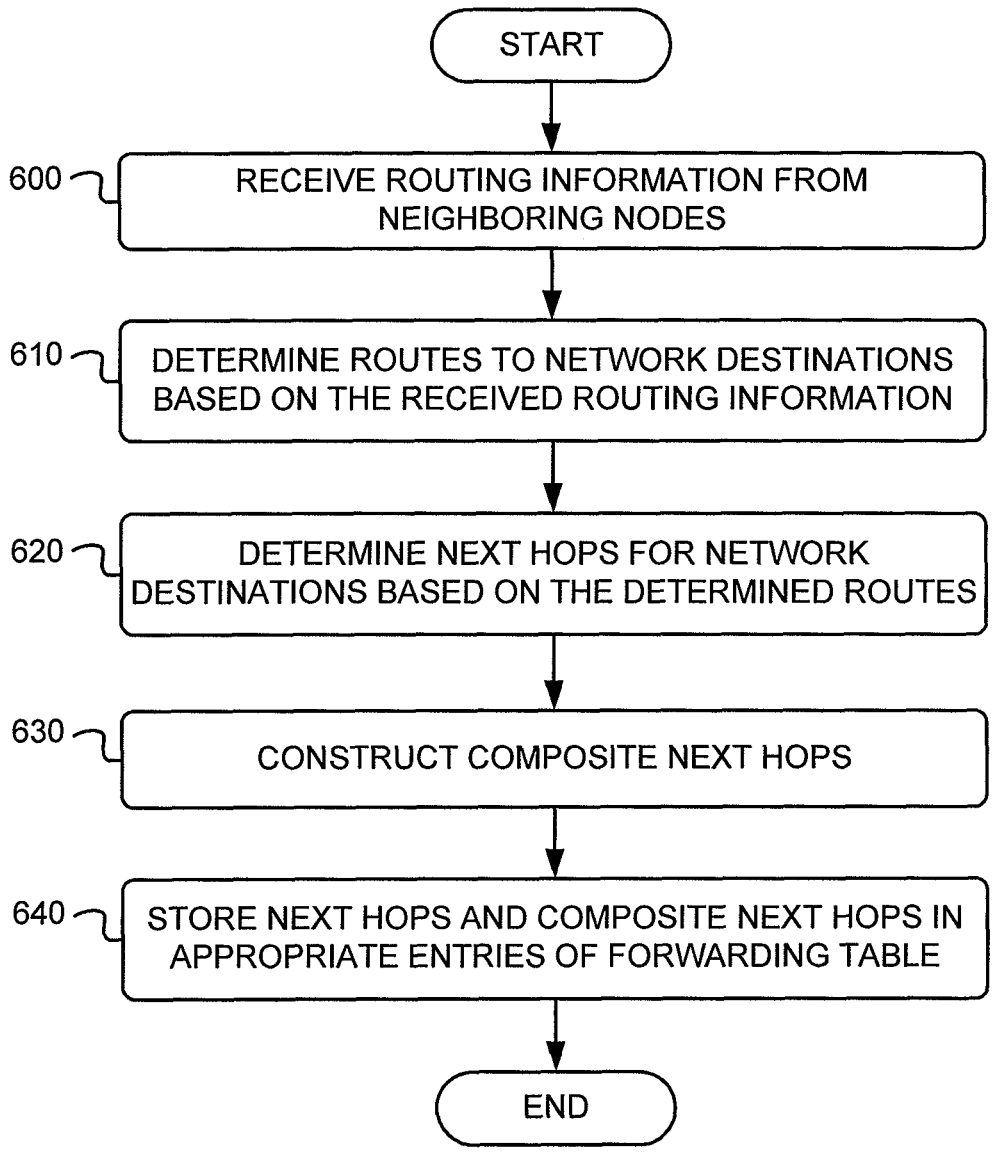
FIG. 6 is a flow chart that illustrates an exemplary process for constructing one or more next hops and/or composite next hops and for storing them in a forwarding table.

FIG. 6 is a flowchart of an exemplary process for constructing one or more next hops and/or composite next hops and storing them in a forwarding table. The exemplary process of FIG. 6 may be performed by routing engine 220 for each interface 200/230 of network node 140-x.

The exemplary process may begin with the receipt of routing information from neighboring nodes (block 600). The routing information may be received from neighboring nodes in data units that include distance vector information or link state information used in distance vector or link state routing protocols. For example, in link state routing, a neighboring node may send a link state data unit that includes, for example, an identifier of the node that created the link state data unit, a list of directly connected neighbors of that neighboring node, and a cost of the link to each of the directly connected neighbors.

Routes to network destinations may then be determined based on the received routing information (block 610). Various routing algorithms may be used to determine routes to network destinations including, for example, Dijkstra's shortest-path algorithm. Other types of routing algorithms may also be used.

Next hops for network destinations may be determined based on the determined routes (block 620). For example, for each network destination in network 130, a next hop node may be determined for reaching that network destination from the current network node (i.e., the next network node in the route from the current node to the network destination) based on a determined route that reaches that network destination.

Composite next hops may be constructed (block 630). As already described herein, a "composite next hop" (C) may be defined as $C=F(NH_1, NH_2, \ldots, NH_N)$, where the composite next hop's composition function is "F( )" and the next hops over which the composition function should be carried out are $NH_1, NH_2, \ldots, NH_N$. The composition function F states what activity to carry out with next hops $\{NH_1, NH_2, \ldots, NH_N\}$. One or more of the next hops $\{NH_1, NH_2, \ldots, NH_N\}$ may themselves also be composite next hops. Thus, a composite next hop may include a list of next hops, each of which may further include arbitrary compositions of next hops to arbitrary degrees that may be referenced as a single entry in forwarding table 315 and subsequently used for forwarding one or more copies of a data unit towards one or more destinations.

Figure 7:
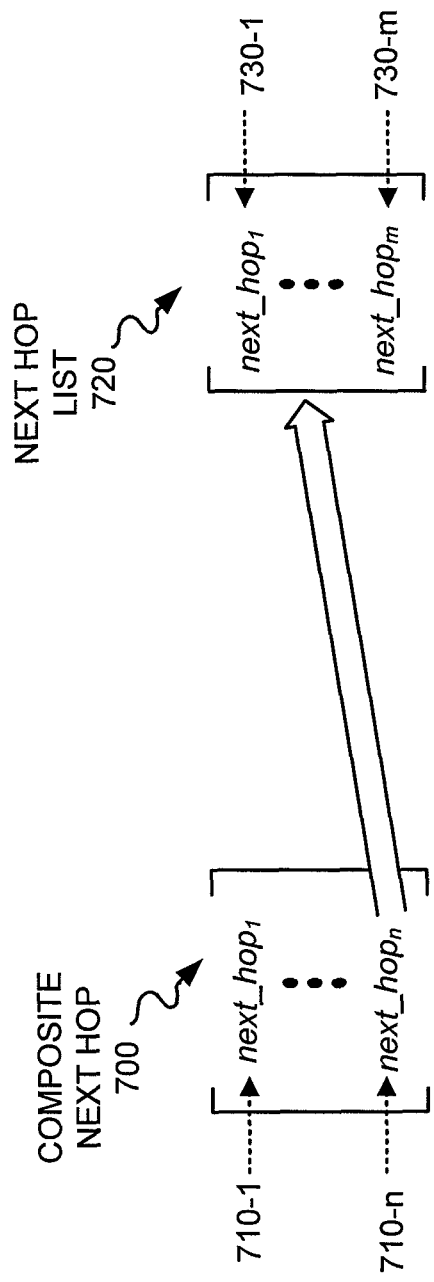
FIG. 7 depicts a generalized representation of a composite next hop according to an exemplary implementation.

FIG. 7 depicts a generalized representation of a composite next hop 700. As shown in FIG. 7, a composite next hop 700 may include components 710-1 through 710-n, where n>2 and where zero or more of the components 710-1 through 710-n may themselves also be composite next hops (i.e., zero in a case when the composition function for composite next hop 700 is over a set of elemental next hops only). In FIG. 7, next hop 710-n, by way of example, is shown as a composite next hop that includes a reference to a next hop list 720 which may include multiple next hops 730-1 through 730-m. Each of next hops 730-1 through 730-m may include an address associated with a next hop node or, in some implementations, may include a reference to another composite next hop or a next hop list. Next hop 710-1 may include an address associated with a next hop node or, in some implementations, may include a reference to another composite next hop or a next hop list (e.g., a composite next hop similar to composite next hop 700 or a next hop list similar to next hop list 720). Composite next hops, thus, permit a hierarchical building of forwarding activities where a given composite next hop is akin to a "subroutine" call of pre-set-up forwarding activities. Use of composite next hops permits the required number of next hops to be substantially reduced.

Figure 8:
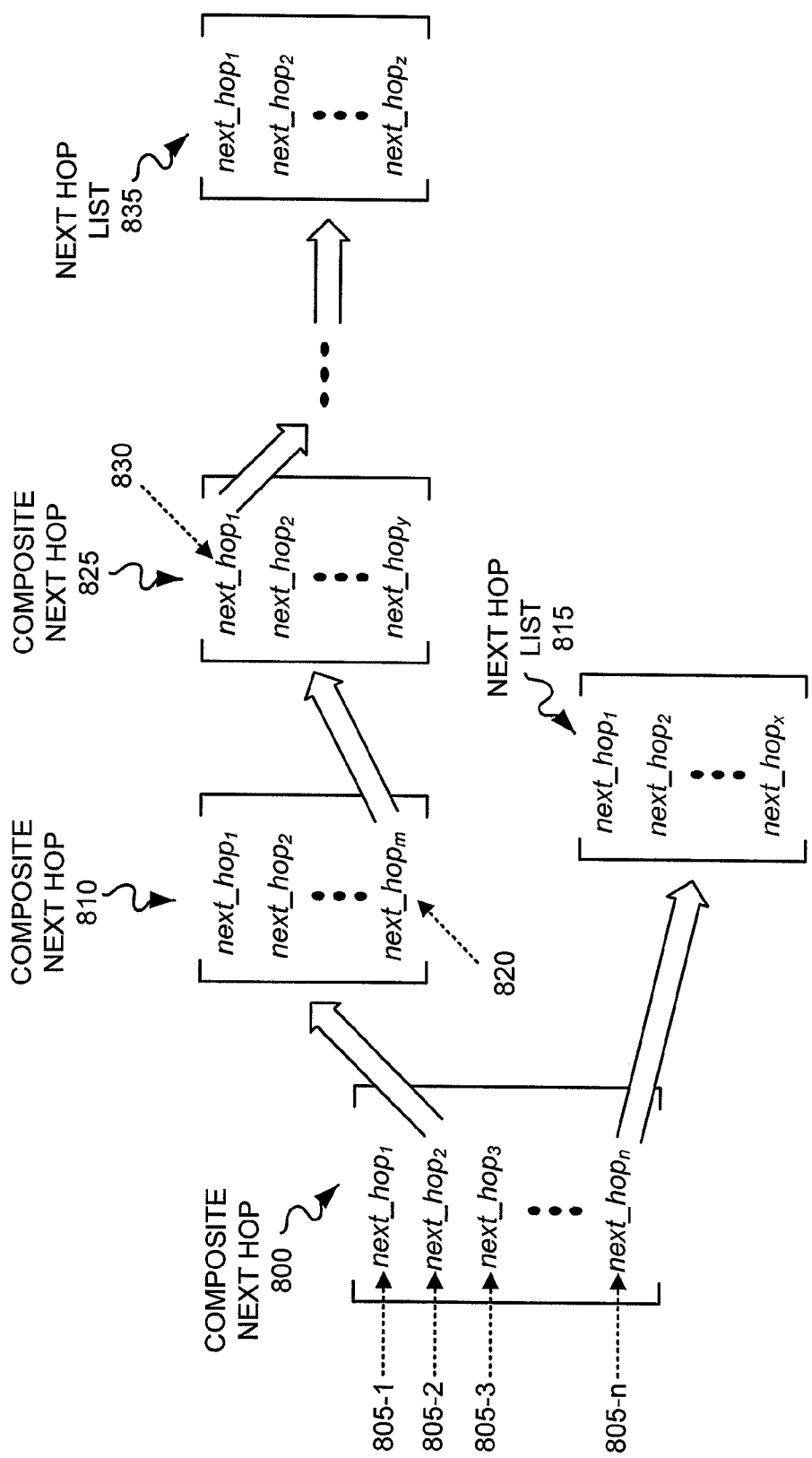
FIGS. 8-10 depict illustrative examples of the generalized composite next hop of FIG. 7.
Figure 9:
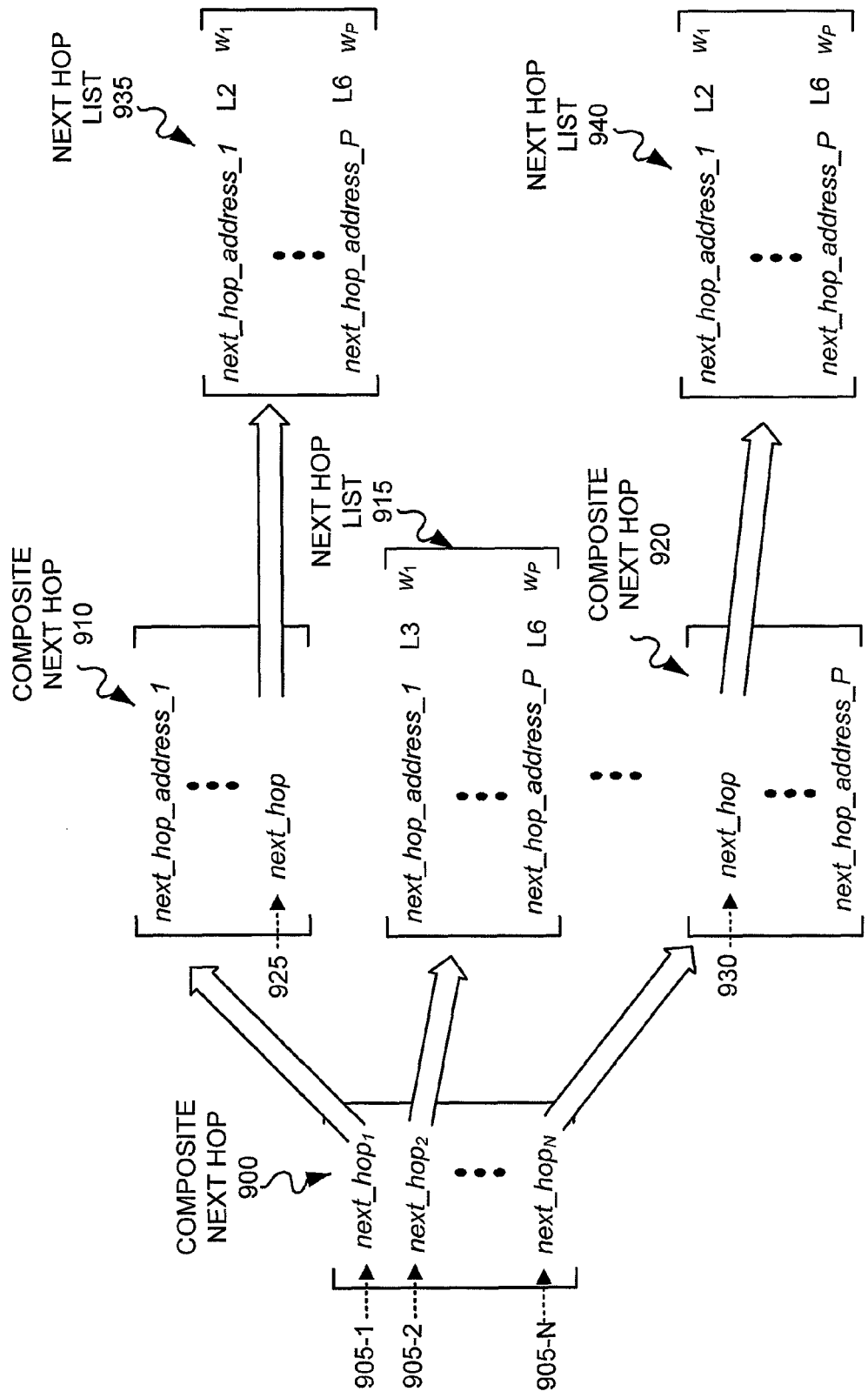
Figure 10:
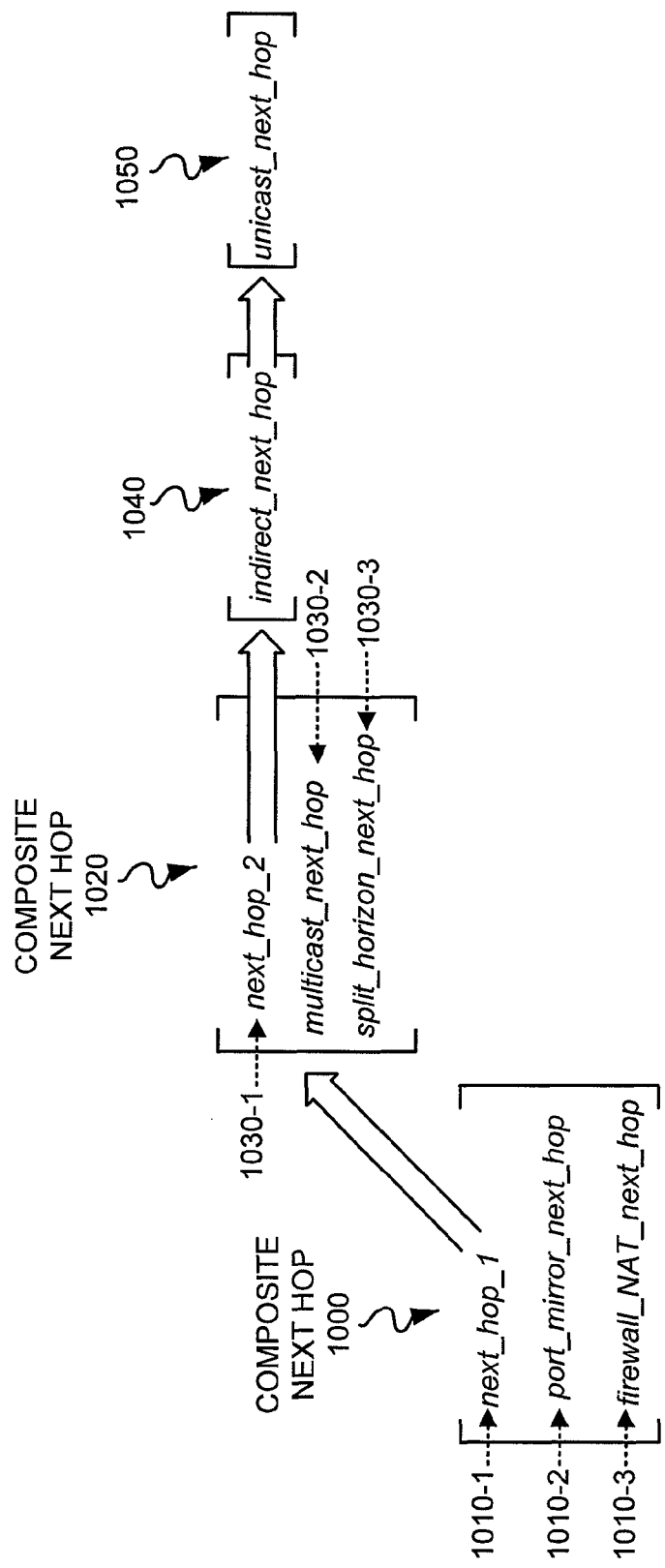

FIGS. 8-10 depict illustrative various examples of the generalized composite next hop 700 of FIG. 7. In the illustrative example of FIG. 8, which includes compositions of next hops to an arbitrary degree, composite next hop 800 includes a list of next hops 805-1 through 805-n, wherein next hop 805-2 includes a reference to another composite next hop 810. Next hops 805-1 and 805-3 include addresses of next hops nodes and next hop 805-n includes a reference to a next hop list 815. Next hop list 815 may include a list of multiple elemental next hops. Composite next hop 810 may include a list of multiple next hops, where next hop 820 may include a reference to another composite next hop 825. Composite next hop 825 may include a list of multiple next hops, where next hop 830 may include a reference to another composite next hop (not shown) that is a first in a chain of nested composite next hops. The composite next hop in the chain may, for example, include a reference to next hop list 835. Next hop list 835 may include a list of addresses of next hop nodes. An arbitrary number of composite next hops, thus, may be included between composite next hop 825 and next hop list 835.

FIG. 9 depicts another illustrative example of the composite next hop 700 of FIG. 7, in which each next hop in the composite next hop refers to another next hop list or to another composite next hop. As shown in FIG. 9, composite next hop 900 may include multiple next hops 905-1 through 905-N. Next hop 905-1 may include a reference to a composite next hop 910, next hop 905-2 may include a reference to a next hop list 915 and next hop 905-N may include a reference to another composite next hop 920. Composite next hop 910 may include multiple next hops, with a next hop 925 that includes a reference to a next hop list 935. Next hop list 935 may include a list of addresses of next hop nodes. Each next hop address in next hop list 935 may be associated with a link and a weight. Each link identifies the outgoing link through which the forwarded data unit may be sent from node 140-x. Each weight may include a relative probability value for choosing which next hop addresses of next hop list 935 that may be used for forwarding a copy of the data unit. The probability value of a weight may be based on particular properties of the data unit. The weights of next hop list 935, thus, may determine the one or more next hop addresses and links that may be used for forwarding one or more copies of a data unit. Next hop list 915 may include a list of addresses of next hop nodes, with each next hop address in list 915 being associated with a link and a weight. Composite next hop 920 may include multiple next hops, with a next hop 930 that includes a reference to a next hop list 940. Next hop list 940 may include a list of addresses of next hop nodes, with each next hop address in list 915 being associated with a link and a weight.

FIG. 10 depicts another illustrative example of the generalized composite next hop 700 of FIG. 7. As shown in FIG. 10, composite next hop 1000 may include a function that may perform all the actions of the next hops identified as next hops 1010-1, 1010-2 and 1010-3. Next hop 1010-1 may itself include a composite next hop 1020 whose function may perform only one of the actions of the next hops identified as 1030-1, 1030-2 and 1030-3 based on one or more properties of the data unit (e.g., a hash calculated from the data unit header, using weights, etc.). Next hop 1010-2 may cause a copy of the data unit to be forwarded to a network monitoring connection of another node and/or interface. Next hop 1010-3 may forward the data unit to one or more intermediate service cards that carry out firewall and/or network address translation (NAT) on the data unit. Next hop list 1020 may include a next hop 1030-1, a multicast next hop 1030-2 and a "split horizon" next hop 1030-3. Next hop 1030-1 may include a reference to an indirect next hop 1040 that includes a pointer to a unicast next hop 1050. The pointer in indirect next hop 1040 may be changed to point to some other unicast next hop. Multicast next hop 1030-2 may make N copies of the data unit and forward each copy of the data unit to one of the multicast destinations. Split horizon next hop 1030-3 may make a copy of the data unit for each interface of node 140-x, except for the ingress interface, and forward each copy out through every interface of node 140-x except for the ingress interface. In one implementation, weights (not shown) may be associated with each of the next hops of next hop list 1020 and used as a relative probability for choosing one of next hops 1030-1, 1030-2 and 1030-3 for forwarding one or more copies of the data unit.

The composite next hops 700, 800, 900 and 1000 of FIGS. 7-10 are shown for purposes of example and illustration. A composite next hop, as described herein, may include arbitrary compositions of next hops (including composite next hops) that may be nested to an arbitrary degree.

In the absence of composite next hops, one would have to re-do the actions of each elemental next hop in each disparate next hop "composition" of which it is a part (akin to in-lining the activity of a code block in the absence of function-calls). This would require the control plane to track and update each of the elemental next hops' action distinctly in the disparate compositions. Composites allow the control plane to update just the specific elemental next hop. Composites, thus, afford scaling: use of less space, and fast re-convergence due to being able to update specific parts of a composite. As an example, consider FIG. 10. The multicast next hop 1030-2 is a part of the composite next hop 1000 by virtue of being one of the sub-next hops in the composite next hop 1010-1. Without the notion of composite next hops (and composition of elemental next hops into "higher" next hops), and if 1030-2 were also a part of other next hops, then when 1030-2 changes we would have to update the "replicas" of 1030-2 in each of the other next hops of which it is a part. This has disadvantages from both space and time perspectives. Hence, composite next hops afford benefits in terms of scaling.

Composite next hops allow modularization. Without the notion of a composite next hop, it would be difficult to map the activities of complex chains of elemental action. Once again, taking the example of FIG. 10, if the elemental actions such as "replicate pkts [multicast]," "split-horizon," "port-mirror," "NAT" etc. are available, as well as a systemic method to put together these actions also being available, it is easier to conceptualize and implement the complex actions comprising the elemental activities than if they were to be done from scratch every time.

The determined next hops and constructed composite next hops may be stored in appropriate entries of forwarding table 315 (block 640). For example, next hop addresses and composite next hops may be stored in a next hop field 520 in association with their respective destinations 510 in respective entries 500 of forwarding table 315.

Exemplary Data Unit Forwarding Process

Figure 11:
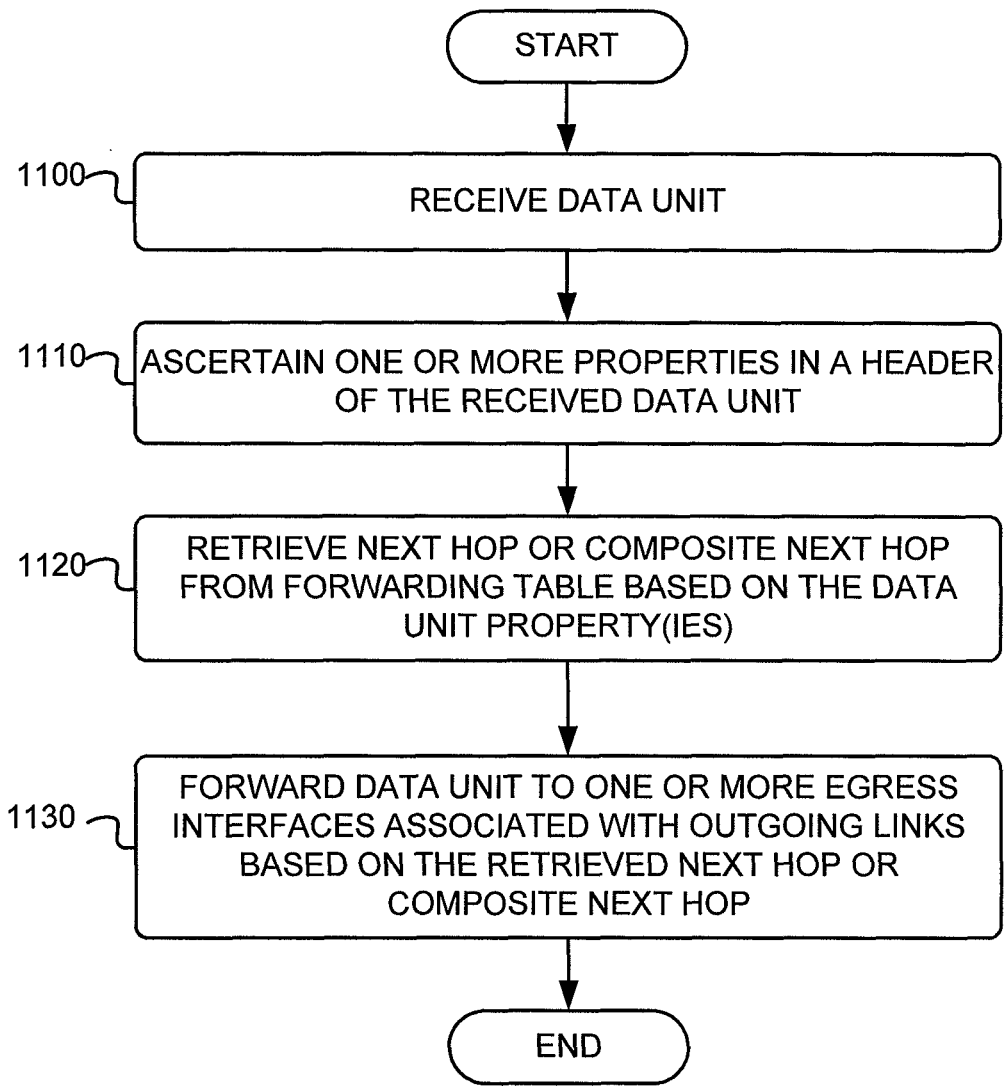
FIG. 11 is a flow chart that illustrates an exemplary process for forwarding data units based on a retrieved next hop address or composite next hop.

FIG. 11 is a flowchart of an exemplary process for forwarding data units based on a retrieved next hop address or composite next hop. The exemplary process of FIG. 11 may be performed by a forwarding engine 310 associated with each interface 200/230 of network node 140-x.

The exemplary process may begin with the receipt of a data unit (block 1100). An incoming data unit from network 130 may be received at forwarding engine 310 of interface 200/230 via, for example, a physical link. One or more properties in a header of the received data unit may be ascertained (block 1110). For example, a destination address 440 from the header 410 of data unit 240 may be retrieved to determine the address of the data unit's destination in network 130. A next hop address or composite next hop may be retrieved from forwarding table 315 based on the data unit property(ies) (block 1120). For example, forwarding engine 310 may use the destination address 440 retrieved from the header 410 of data unit 240 to identify an entry 500 of forwarding table 315 that has a matching address in destination field 510. The next hop or composite next hop stored in the corresponding next hop field 520 of the identified entry 500 may then be retrieved from forwarding table 315.

The data unit may be forwarded to one or more egress interfaces associated with outgoing links based on the retrieved next hop or composite next hop (block 1130). For example, if composite next hop 800 is retrieved from next hop field 520 of forwarding table 315, multiple copies of the data unit may be forwarded to next hop addresses associated with next_hop$_1$ and next_hop$_3$ of composite next hop 800 and to next hops associated with composite next hop 810 and next hop list 815. The one or more egress service interfaces may then subsequently forward the data unit towards the next hop(s).

Example

Figure 12:
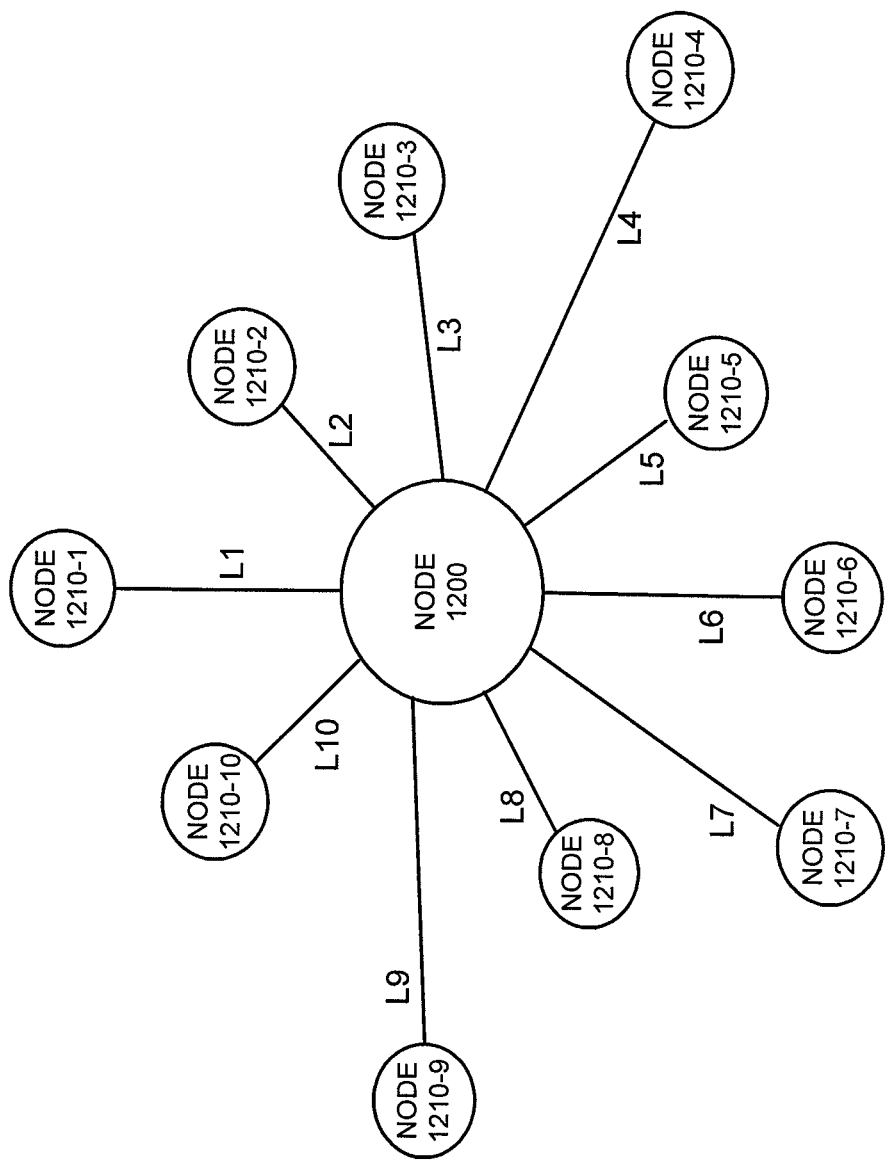
FIG. 12 depicts an illustrative example of a network node connected to neighboring nodes via multiple links.
Figure 13:
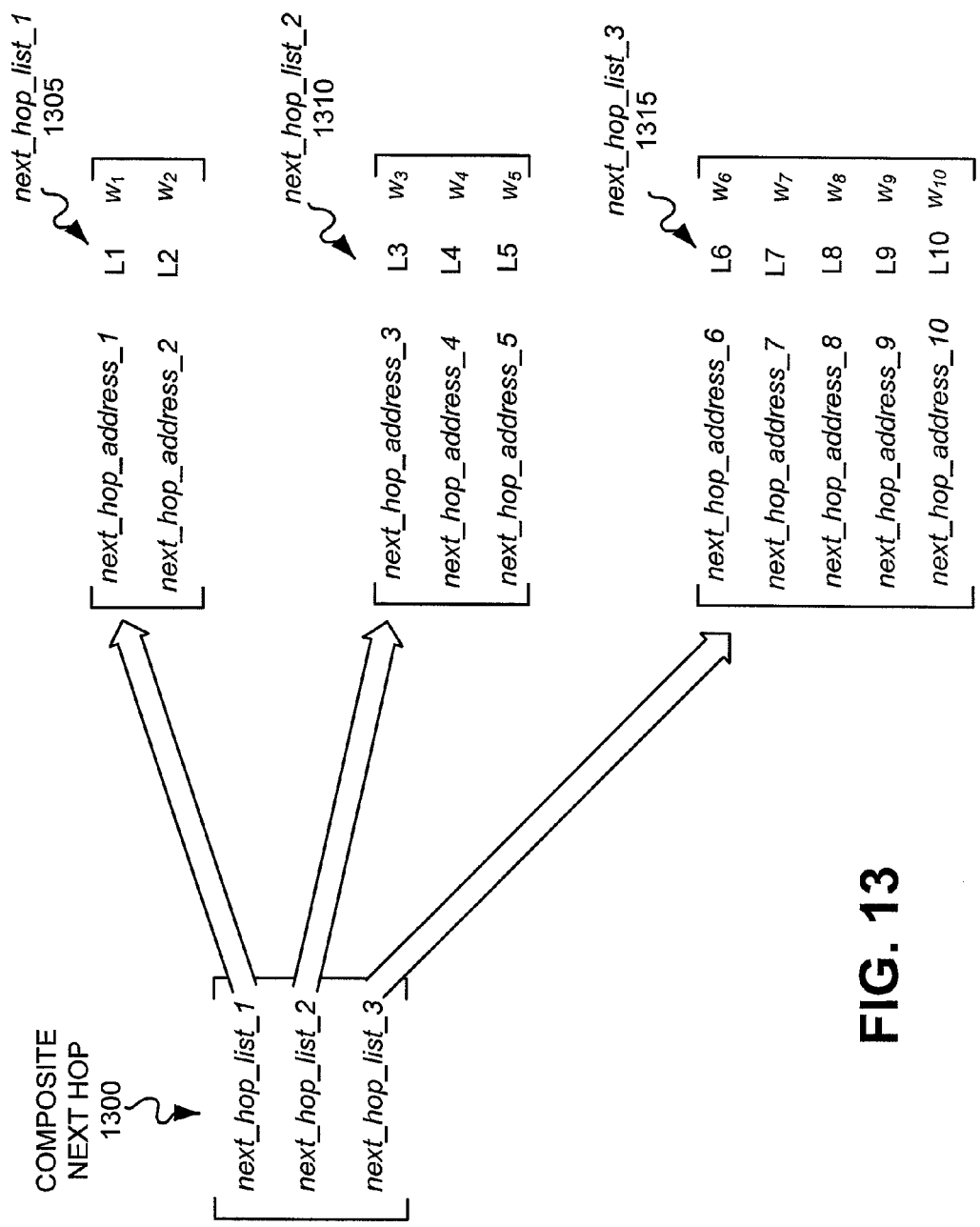
FIG. 13 depicts an exemplary composite next hop that may be used at the network node of FIG. 12 for forwarding a data unit to the neighboring nodes via the multiple links.

FIGS. 12 and 13 illustrate an example of the use of a composite next hop for forwarding multiple copies of a data unit from a network node to next hop neighboring nodes. As shown in FIG. 12, a network node 1200 may connect to multiple neighboring nodes 1210-1 through 1210-10 via respective links L1 through L10. FIG. 13 further depicts a composite next hop 1300 that may be stored in an entry of a forwarding table similar to forwarding table 315, or an associated memory, at network node 1200. As shown in FIG. 13, composite next 1300 may include multiple next hops, each of which includes a reference to a respective next hop list 1305, 1310 or 1315. Next hop list 1305 may include two next hops, with a next hop address, an outgoing link and a weight being associated with each of the next hops. Next hop list 1310 may include three next hops, with a next hop address, an outgoing link and a weight being associated with each of the next hops. Next hop list 1315 may include five next hops, with a next hop address, an outgoing link and a weight being associated with each of the next hops.

Three copies of a data unit may be forwarded to neighboring nodes based on composite next hop 1300. A first copy of the data unit may be forwarded to either next_hop_address_1 or next_hop_address_2 via links L1 or L2 based on weights $w_1$ and $w_2$. A second copy of the data unit may be forwarded to either next_hop_address_3, next_hop_address_4, or next_hop_address_5 via links L3, L4 or L5 based on weights $w_3$, $w_4$ and $w_5$. A third copy of the data unit may be forwarded to either next_hop_address_6, next_hop_address_7, next_hop_address_8, next_hop_address_9, or next_hop_address_10 via links L6, L7, L8, L9 or L10 based on weights $w_6$, $w_7$, $w_8$, $w_9$ and $w_{10}$.

CONCLUSION

The foregoing description of embodiments described herein provides illustration and description, but is not intended to be exhaustive or to limit the embodiments described herein to the precise form disclosed. Modifications and variations are possible in light of the above teachings or may be acquired from practice of the invention. While series of blocks have been described in FIGS. 6 and 11, the order of the blocks may vary in other implementations. Also, non-dependent blocks may be performed in parallel.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A method comprising:
    generating, by a device, information identifying a composite next hop that includes information identifying a plurality of next hops,
        the plurality of next hops identifying a plurality of actions to be performed on one or more data units;
    receiving, by the device, a data unit;
    identifying, by the device and based on the data unit, the information identifying the composite next hop;
    performing, by the device and based on the information identifying the composite next hop, a function associated with the composite next hop,
        performing the function including performing, on the data unit and by the device, different actions of the plurality of actions identified by the plurality of next hops,
            performing the different actions on the data unit including at least two of:
                replacing a header of the data unit,
                performing a network address translation on the data unit,
            or
                replicating the data unit; and
    forwarding, by the device, the data unit towards one or more network destinations after performing the function.

2. The method of claim 1, where generating the information identifying the composite next hop includes:
    receiving routing information; and
    determining, based on the received routing information, one or more routes to the one or more network destinations,
        where the information identifying the composite next hop is generated based on the determined one or more routes.

3. The method of claim 2, where generating the information identifying the composite next hop further includes:
    determining, based on the determined one or more routes, the plurality of next hops; and
    generating the information identifying the composite next hop based on determining the plurality of next hops.

4. The method of claim 1, where performing the function includes:
    replicating the data unit to obtained multiple copies of the data; and
    forwarding the multiple copies of the data unit towards at least one of the one or more network destinations.

5. The method of claim 1, where performing the different actions includes:
    forwarding the data unit to a component of the device based on a first next hop of the plurality of next hops;
    performing, at the component and on the data unit, the network address translation based on the first next hop of the plurality of next hops; and
    replacing, after performing the network address translation, the header of the data unit based on a second next hop of the plurality of next hops.

6. The method of claim 5, where
    replacing the header of the data unit includes replacing a layer 2 header of the data unit.

7. The method of claim 1, where the composite next hop further includes information identifying another composite next hop,
    the other composite next hop identifying another plurality of next hops, and
    where performing the function includes performing a function associated with the other composite next hop,
        performing the function associated with the other composite next hop including performing, on the data unit, another plurality of actions identified by the other plurality of next hops.

8. The method of claim 1, where performing the plurality of actions includes at least one of:
    performing each action, of the plurality of actions, in a particular sequence; or
    performing the different actions until a condition is satisfied or is no longer satisfied.

9. The method of claim 1, where performing the different actions includes:
    replacing the header of the data unit;
    performing the network address translation on the data unit; and
    replicating the data unit.

10. A device comprising:
    a memory to store instructions; and
    a processor to execute the instructions to:
        receive routing information associated with a plurality of next hops
            the plurality of next hops identifying a plurality of actions to be performed, by the device, on a data unit as the data unit is forwarded towards one or more network destinations,
        generate, based on the received routing information, information identifying a composite next hop that includes information identifying the plurality of next hops,
        perform a function associated with the composite next hop,
            when performing the function, the processor is to perform the plurality of actions, associated with the plurality of next hops, on the data unit,
                when performing the plurality of actions, the processor is to at least two of:
                    replace a header of the data unit,
                    perform a network address translation on the data unit, or
                    replicate the data unit, and
        forward the data unit towards the one or more network destinations after performing the function.

11. The device of claim 10, where, when performing the plurality of actions, the processor is to:
replicate the data unit to obtain a copy of the data unit based on a first next hop of the plurality of next hops, and
forward the data unit towards a network destination, of the one or more network destinations, associated with the first next hop.

12. The device of claim 11, where, when performing the plurality of actions, the processor is further to:
replace a layer 2 header of the data unit, as part of replacing the header of the data unit, based on a first next hop of the plurality of next hops,
perform a network address translation on the data unit, after replacing the layer 2 header, based on a second next hop of the plurality of next hops, and
forward the data unit, after performing the network address translation, towards at least one of the one or more network destinations.

13. The device of claim 10, where the processor is further to:
determine, based on the received routing information, one or more routes to the one or more network destinations, where the information identifying the composite next hop is generated based on the determined one or more routes.

14. The device of claim 10, where, when performing the plurality of actions, the processor is to at least one of:
perform the plurality of actions in a particular sequence, or
perform the plurality of actions until a condition is satisfied or is no longer satisfied.

15. The device of claim 10, where, when performing the plurality of actions, the processor is to:
replicate the data unit to obtain copies of the data unit, and at least one of:
replace headers of the copies of the data unit, or
perform a network address translation on the copies of the data unit,
the copies of the data unit being forwarded towards at least one of the network destinations after the at least one of replacing the headers or performing the network address translation.

16. A non-transitory computer-readable memory device storing instructions, the instructions comprising:
one or more instructions which, when executed by a device, cause the device to receive routing information associated with a plurality of next hops,
the plurality of next hops identifying actions to be performed on a data unit as the data unit is forwarded towards one or more network destinations;
one or more instructions which, when executed by the device, cause the device to generate, based on the received routing information, information identifying a composite next hop that identifies the plurality of next hops;
one or more instructions which, when executed by the device, cause the device to perform, on the data unit and based on the composite next hop, a plurality of actions of the actions that are identified by the plurality of next hops,
the one or more instructions to perform the plurality of the actions including at least two of:
one or more instructions to replace a header of the data unit,
one or more instructions to perform a network address translation on the data unit, or
one or more instructions to replicate the data unit, and
one or more instructions which, when executed by the device, cause the device to forward the data unit towards the one or more network destinations after performing the function.

17. The non-transitory computer-readable memory device of claim 16, where the one or more instructions to perform the plurality of actions include:
one or more instructions to replace a header of the data unit based on a first next hop of the plurality of next hops;
one or more instructions to perform a network address translation on the data unit based on a second next hop of the plurality of next hops; and
one or more instructions to replicate the data unit based on a third next hop of the plurality of next hops,
replacing the header of the data unit, performing the network address translation, and replicating the data unit being performed in a particular sequence.

18. The non-transitory computer-readable memory device of claim 16, where the information identifying the composite next hop further includes information identifying the function.

19. The non-transitory computer-readable memory device of claim 18, where the one or more instructions to perform the plurality of actions include:
one or more instructions to perform each action, of the actions, until a condition is satisfied or is no longer satisfied; or
one or more instructions to perform the plurality of actions in a particular sequence.

20. The non-transitory computer-readable memory device of claim 16, where the one or more instructions to generate the information identifying the composite next hop include:
one or more instructions to determine, based on the received routing information, one or more routes to the one or more network destinations;
one or more instructions to determine, based on the determined one or more routes, the plurality of next hops;
one or more instructions to store the information identifying the composite next hop in a single entry in a data structure; and
one or more instructions to retrieve, from the single entry and using a destination address included the data unit, the information identifying the composite next hop,
where the plurality of actions are performed on the data unit based on retrieving the information identifying the composite next hop.

* * * * *